United States Patent [19]

Baskent et al.

[11] 4,309,508

[45] Jan. 5, 1982

[54] SILOXANE COPOLYMER MIXTURES USEFUL AS FOAM STABILIZERS IN HIGH RESILIENCE POLYURETHANE FOAM

[75] Inventors: Feyyaz O. Baskent; Bela Prokai, both of Mahopac, N.Y.

[73] Assignee: Union Carbide Corporation, New York, N.Y.

[21] Appl. No.: 163,974

[22] Filed: Jun. 30, 1980

[51] Int. Cl.$^3$ .......................... C08G 18/14; C07F 7/08; C07F 7/10

[52] U.S. Cl. ..................................... 521/112; 252/182; 252/351; 252/DIG. 1; 556/445; 521/111; 521/904

[58] Field of Search ...................... 521/111, 112, 904; 556/445

[56] References Cited

U.S. PATENT DOCUMENTS

| | | | |
|---|---|---|---|
| 3,741,917 | 6/1973 | Morehouse | 260/2.5 AH |
| 3,839,384 | 10/1974 | Morehouse | 260/448.2 |
| 3,905,924 | 9/1975 | Prokai | 260/2.5 AH |
| 3,935,123 | 1/1976 | Prokai et al. | 252/351 |
| 3,935,133 | 1/1976 | van Leeuwen et al. | 260/2.5 AH |
| 3,966,784 | 6/1976 | Prokai | 521/111 |
| 4,042,540 | 8/1977 | Lammerting et al. | 260/2.5 AH |
| 4,119,582 | 10/1978 | Matsubara et al. | 521/112 |

*Primary Examiner*—H. S. Cockeram
*Attorney, Agent, or Firm*—Francis M. Fazio

[57] ABSTRACT

Siloxane copolymer mixtures comprising a minor amount of certain high molecular weight (e.g., 4000 to 30,000) siloxane-oxyalkylene copolymers and a major amount of certain low molecular weight (e.g., 300 to 1100) siloxane-oxyalkylene copolymers or cyanoalkylsiloxanes in specifically defined mixture ratios; a process for producing high resilience polyurethane foam utilizing as a foam stabilizer said siloxane copolymer mixtures; and the foams derived therefrom.

11 Claims, No Drawings

4,309,508

SILOXANE COPOLYMER MIXTURES USEFUL AS FOAM STABILIZERS IN HIGH RESILIENCE POLYURETHANE FOAM

FIELD OF THE INVENTION

This invention relates to novel siloxane copolymer mixtures having beneficial utility as foam stabilizers in the manufacture of high resilience polyurethane foam.

BACKGROUND OF THE INVENTION

Basically high resilience polyurethane foams are produced by the reaction of highly primary hydroxyl-capped, high molecular weight polyols with organic isocyanates and water. High resilience polyurethane foams are distinguishable, in part, from conventional hot cure polyurethane foams by the use of such polyols and the fact that high resilience polyurethane foams require little or no oven curing and thus are often referred to as cold cure foams. Such foams are extremely desirable for cushioning applications because of their excellent physical properties, e.g., very high foam resilience, low flammability, opencelled structure, low flex fatigue (long life) and high SAC factors (load bearing properties).

Because of the high reactivity of high resilience foam ingredients and their rapid buildup of gel strength, sometimes the foam can be obtained without a cell stabilizer. However, such foams typically have very irregular cell structure as particularly evidenced by surface voids and the lack of discovery of a proper agent to help control cell structure has been a major problem in the art.

Attempts to solve this problem with surfactants generally employed in the stabilization of hot cure polyurethane foam have not proven satisfactory because such surfactants tend to overstabilize, causing extremely tight, shrinking forms. Nor is the problem corrected by reducing the concentrations of such surfactants, since at concentrations required to eliminate shrinkage, the cells are no longer stabilized satisfactorily and the foam structure becomes irregular, coarse and contains surface voids.

U.S. Pat. No. 4,119,582 discloses a process for manufacturing high resilience flexible polyurethane foam using as a foam stabilizer a mixture of a "high" molecular weight siloxane-oxyalkylene copolymer with a "low" molecular weight siloxane-oxyalkylene copolymer. The "high" molecular weight siloxane-oxyalkylene copolymer contains at least five oxyalkylene units in each oxyalkylene block and is present in the mixture in an amount of from 84.0 to 99.8 weight percent and the "low" molecular weight siloxane-oxyalkylene copolymer contains up to four oxyalkylene units in each oxyalkylene block and is present in the mixture in an amount of from 0.2 to 16.0 weight percent. The "high" molecular weight siloxane-oxyalkylene copolymer has a molecular weight range of from 1,000 to 16,000 and the "low" molecular weight siloxane-oxyalkylene copolymer has a molecular weight range of from 500 to 10,000. Hence, the two classes of copolymers are not necessarily distinguished by their molecular weights but rather by the number of oxyalkylene units in the oxyalkylene blocks. This patent discloses that humidity resistance is the principal foam property improved by the use of the copolymer mixtures. The only foams exemplified are apparently of moderate density (i.e., they are apparently produced from reaction mixtures containing 2.7 parts by weight water per 100 parts by weight polyol). The only exemplified copolymer mixture whose specific composition is given comprises "Surfactant A" whose calculated molecular weight is 5946 and "Surfactant B" whose calculated molecular weight is 1716.

Several other patents disclose organosiloxane copolymers and their use as foam stabilizers in high resilience foam formulations. U.S. Pat. No. 4,042,540 discloses that a variety of low viscosity siloxanes (e.g., low viscosity alkoxy-modified siloxanes and low viscosity dimethylsilicone oils) are better stabilizers for high resilience polyurethane foams than higher viscosity dimethylsilicone oils. U.S. Pat. No. 3,905,924 relates to the use of cyanoalkylsiloxanes and mixtures of such siloxanes as stabilizers for high resilience polyurethane foam while U.S. Pat. No. 3,839,384 discloses that use for aralkylsiloxanes. U.S. Pat. No. 3,741,917 describes siloxane-oxyalkylene copolymers and mixtures thereof with each other or with dimethylsilicone oils (only the copolymer-oil mixtures are exemplified). The latter patent also discloses the use of said copolymers and mixtures in the formulation of high resilience polyurethane foam. U.S. Pat. No. 3,935,133 teaches the use of high molecular weight silicate esters of polyether alcohols to stabilize high resilience polyurethane foam. U.S. Pat. No. 4,210,726 discloses a process for producing high resilience polyurethane foam utilizing as a foam stabilizer a combination of an organosiloxane copolymer and a hydrocarbon oil. U.S. patent application Ser. No. 134,637, filed Mar. 27, 1980, describes organosiloxane copolymers containing alkyl groups having from 5 to 20 carbon atoms that have beneficial utility as foam stabilizers in the manufacture of low density high resilience polyurethane foam. U.S. patent application Ser. No. 154,849 filed May 30, 1980, describes a process for manufacturing low density high resilience polyurethane foams utilizing as a foam stabilizer selected low molecular weight alkoxysilicone compositions containing from one to 18 silicon atoms in which the alkoxy-modifying group contains from 5 to 18 carbon atoms. However, none of the above mentioned patents or applications disclose the novel siloxane copolymer mixtures of this invention or their unexpectedly beneficial utility as foam stabilizers in the manufacture of low density high resilience polyurethane foam.

Within the past few years, cushions fabricated from high resilience polyurethane foam have gained increasingly wide acceptance in automotive seatings. Automotive industry requirements decreased the foam density needed for seat cushions, thus increasing the difficulty of stabilization of high resilience polyurethane foam. Recently new polymer/polyol systems with high water levels have been proposed which can produce foam cushions with densities of 1.50 to 1.75 lbs./cubic foot and acceptable physical properties in comparison to the commercial foaming systems. However, without any foam stabilizing surfactant, the new polymer/polyol-high water systems produced foams with large and irregular cells or caused collapse of the foam. The addition of commercial high resilience polyurethane foam surfactants (including the low viscosity dimethylsilicone oils, cyanoalkylsiloxanes and siloxane-oxyalkylene copolymers disclosed in the above-mentioned patents) to this new polymer/polyol-high water system did not correct these problems. The commercial high resilience polyurethane foam surfactants caused collapse of the foams, and commercial flexible "hot-cure" polyurethane surfactants caused severe shrinkage and pneumatic foams. Thus, it is a problem in low density high resilience polyurethane foam formulations to obtain a surfactant which has a proper degree of cell stabilizing ability. This problem is solved by the present invention and also by copending U.S. application Ser. No. 134,637, filed Mar. 27, 1980, and copending U.S. application Ser. No. 154,849 filed May 30, 1980, described hereinabove.

SUMMARY OF THE INVENTION

This invention is based, in part, on the discovery that certain siloxane copolymer mixtures can be used to control the cell uniformity of low density high resilience resilience polyurethane foam with little, if any, foam shrinkage. Moreover, voids in the foam are eliminated (or at least greatly reduced) by the instant invention and the cell structure of the low density high resilience polyurethane foam is also much more uniform and finer than where no surfactant agent is used. The present invention provides novel siloxane copolymer mixtures comprising a minor amount of certain high molecular weight (e.g., 4000 to 30,000) hydrolyzable or non-hydrolyzable siloxane-oxyalkylene copolymers and a major amount of certain low molecular weight (e.g., 300 to 1100) non-hydrolyzable silioxane-oxyalkylene copolymers or cyanoalkylsiloxanes in specifically defined mixture ratios, which unexpectedly produce low density high resilience polyurethane foams with excellent cell structure in comparison to commercial high resilience polyurethane foam surfactants.

More specifically the present invention discloses siloxane copolymer mixtures comprising: (1) from about 1 to about 35 weight percent of a high molecular weight siloxane-oxyalkylene copolymer selected from the group consisting of: (a) a siloxane-oxyalkylene copolymer having the average formula:

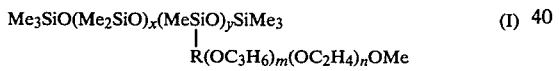
(I)

where Me is methyl, R is an alkylene containing 2 to 4 carbon atoms, x has an average value from about 50 to about 70, y has an average value from about 4 to about 15, m has an average value from about 15 to about 25, and n has an average value from about 15 to about 25; and (b) a siloxane-oxyalkylene copolymer having the average formula:

$$Bu(OC_2H_4)_d(OC_3H_6)_cO_{0.5}[(Me_2SiO)_b(MeSiO_{1.5})_a][_{0.5}O(C_3H_6O)_c(C_2H_4O)_dBu]_{a+1}$$ (II)

where Me is methyl, Bu is butyl, a has an average value from 1 to 2, b has an average value from about 12 to about 24, c has an average value from about 10 to about 30, and d has an average value from about 10 to about 40; and (2) from about 65 to about 99 weight percent of a low molecular weight siloxane selected from the group consisting of: (c) a siloxane-oxyalkylene copolymer having the average formula:

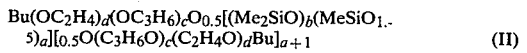
(III)

where Me is methyl, R is an alkylene containing 2 to 4 carbon atoms, o has an average value from about 1 to about 4, p has an average value from about 0.5 to about 3, and e has an average value from about 1 to about 5; and (d) a cyanoalkylsiloxane having the average formula:

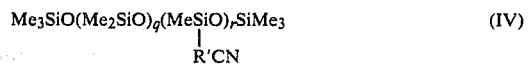
(IV)

where Me is methyl, R' is an alkylene containing 3 to 6 carbon atoms, q has an average value from about 1 to about 4, and p has an average value from about 0.5 to about 4, said weight percents being based on the weights of (1) and (2). In the above formulae, R and R' can be linear or branched bivalent alkylene radicals. Illustrative of the linear and branched bivalent alkylene radicals encompassed by R are: ethylene; 1,3-propylene; 1,2-propylene; 1,4-butylene; 1,2-butylene; and 2,3-butylene. Illustrative of the linear and branched bivalent alkylene radicals encompassed by R' are: 1-propylene; 1,3-propylene; 1,2-propylene; 1-butylene; 1,4-butylene; 1,2-butylene; 2,3-butylene; 1,5-pentylene; 1,2-pentylene; and 1,6-hexylene. The preferred siloxane copolymer mixtures contain from 5 to 30 weight percent of a high molecular weight siloxane-oxyalkylene copolymer of Formula I or Formula II and from 70 to 95 weight percent of a low molecular weight siloxane-oxyalkylene copolymer of Formula III or cyanoalkylsiloxane of Formula IV. The high molecular weight siloxane-oxyalkylene copolymers of Formula I and Formula II have a preferred molecular weight range from 4000 to 30,000 and the low molecular weight siloxane-oxyalkylene copolymer of Formula III and cyanoalkylsiloxane of Formula IV have a preferred molecular weight range from 300 to 1100.

The present invention also relates to the use of the siloxane copolymer mixtures of the present invention as cell stabilizers in the preparation of low density high resilience polyurethane foam. More specifically the instant invention is directed, in part, to a process for preparing high resilience polyurethane foam having a density of no greater than 2.0 pounds per cubic foot (preferably no greater than 1.75 pounds per cubic foot), said process comprising foaming and reacting a reaction mixture comprising: (a) an organic polyol selected from the group consisting of (i) a polyether triol containing at least 40 mole percent primary hydroxyl groups and having a molecular weight from about 2000 to about 8000 and (ii) a mixture of said polyether triol and another polyether having an average of at least two hydroxyl groups, said polyether triol of said mixture amounting to at least 40 weight percent of the total polyol content; (b) a polyisocyanate, said organic polyol and said polyisocyanate being present in the mixture in a major amount and in the relative amount required to produce the polyurethane foam; (c) a blowing agent in a minor amount sufficient to foam the reaction mixture; (d) a catalytic amount of catalysts for the production of polyurethane foam; (e) a minor amount of the siloxane copolymer mixture of the present invention; and, optionally, (f) a flame retardant in a minor amount sufficient to retard the flammability of the polyurethane foam. Low density high resilience polyurethane foams obtained according to the process of this invention have uniform cell structure and a smooth molding surface. In addition, the siloxane copolymer mixtures according to the invention are operable over a broad range (e.g. 0.02 to 5.0 parts by weight per hundred parts by weight of the polyether polyol) and can be used in solution and consequently are easy to meter and pump during foam formulation.

DESCRIPTION OF THE PREFERRED EMBODIMENTS

The novel siloxane copolymer mixtures of the present invention can be prepared by several methods (e.g., by by mixing certain surfactant solutions). The siloxane copolymer components of the siloxane copolymer mixtures are known materials made by known methods to form the surfactant solutions employed in this invention. For example, each siloxane copolymer is separately dissolved in a suitable organic solvent such as hydrocarbon, halohydrocarbons, organic hydroxyl compounds, alkyl phthalates and the like. Preferably the solvent selected should be one in which the siloxane copolymer component is substantially soluble. For example, it is preferred that at least five parts by weight of the siloxane copolymer component be soluble in 95 parts by weight of solvent. More preferably the minimum percentage of siloxane copolymer component in the siloxane copolymer-solvent solution should be in the range of at least about ten to at least about 30 weight percent. Of course it is understood that such solvents need not be employed and that the maximum percentage of siloxane copolymer component in said solvent solutions is not critical. Moreover, when employed such solvent solutions should of course be correlated to the amounts of active siloxane copolymer that may be employed per hundred parts by weight of the organic polyol starting material as outlined below. Preferably the solvent for the siloxane copolymer component is an organic hydroxyl compound such as hydroxyl terminated organic ether compounds. More preferably they are polyether triols, diols, and mono-ols such as the adducts of ethylene oxide, propylene oxide, butylene oxide, with starters such as glycerol, water, trimethylolpropane, 1,2,6-hexanetriol, ethylene glycol, butanol, nonylphenol, and the like. Of course the oxyalkylene units of such adducts may be of different types, e.g. oxypropylene and oxyethylene groups, and may be randomly distributed or in blocks. The most preferred solvents are the polyether triols having all or predominantly oxypropylene units in the oxyalkylene portion and having molecular weights in the range from about 2,000 to 6,000 insasmuch as they may be the same as or similar to the primary triols employed as the organic polyol starting material of the foam formulation. The siloxane copolymer components diluted in suitable organic solvents form surfactant solutions which are mixed in specifically defined weight ratios to produce the novel siloxane copolymer mixtures of this invention.

The relative amount of siloxane copolymer mixture (exclusive of solvents or other additives) used to make the polyurethane foam can vary over wide ranges and are generally employed in amounts ranging from about 0.02 to about 5 parts by weight or greater per hundred parts by weight of the organic polyol starting material. Generally there is no commensurate advantage to using amounts of mixture greater than about five parts by weight, while the use of amounts below 0.02 parts by weight can detract from stability against foam shrinkage. Preferably the siloxane copolymer mixture is employed in amounts ranging from 0.2 to about 2.0 parts by weight per hundred parts by weight of the organic polyol starting material.

The polyhydroxyl reactants (organic polyols) employed in this invention as the starting materials to prepare the polyurethane foams can be any polyether triol containing at least 40 mole percent of primary hydroxyl groups and having a molecular weight from about 2,000 to about 8,000. Conversely said polyether triols can contain no more than 60 mole percent of secondary hydroxyl groups. Preferably said polyether triols contain about 55 to 90 mole percent of primary hydroxyl groups and have a molecular weight from about 4,000 to about 7,000. The preferred polyether triols used in this invention are polyalkylenether triols obtained by the chemical addition of alkylene oxides to trihydroxyl organic containing materials, such as glycerol; 1,2,6-hexanetriol; 1,1,1-trimethylolethane; 1,1,1-trimethylolpropane; and the like, as well as mixtures thereof. The alkylene oxides employed in producing the preferred polyethers described above normally have from 2 to 4 carbon atoms, inclusive while propylene oxide and mixtures of propylene oxide and ethylene oxide are especially preferred.

The organic polyol starting materials used in this invention can be mixtures consisting essentially of said above defined polyether triols and other polyether polyols having an average of at least two hydroxyl groups, said above defined polyether triols amounting to at least 40, preferably at least 50, weight percent of the total polyol content of the mixtures. Illustrative of such other polyethers are triols outside of the scope defined above, diols, tetraols and polymer/polyols, and the like, as well as mixtures thereof. Examples of such polyether polyols that can be mixed with the above defined polyether triols include those adducts of alkylene oxide to such polyols as diethylene glycol; dipropylene glycol; pentaetythritol; sorbitol; sucrose; lactose; alphamethylglucoside; alpha-hydroxyalkyglucoside; novolac resins; water; ethylene glycol; propylene glycol; trimethylene glycol; 1,2-butylene glycol; 1,3-butanediol; 1,4-butanediol; 1,5-pentanediol; 1,2-hexane glycol; 1,10-decanediol; 1,2-cyclohexanediol; 2-butene-1,4-diol; 3-cyclohexane-1,1-dimethanol; 4-methyl-3-cyclohexene1,1-dimethanol; 3-methylene-1,5-pentanediol; 4-(2-hydroxyethoxy)-1-butanol; and the like; as well as mixtures thereof.

Another type of polyether polyol that can be mixed with the above defined polyether tiols and used as the starting materials in this invention are graft polymer/polyether compositions obtained by polymerizing ethylenically unsaturated monomers in a polyether as described in U.S. Pat. Nos. Re. 28,715 and 29,118 and U.S. Pat. Nos. 4,104,236 and 4,208,314. Suitable monomers for producing such compositions include, for example, acrylonitrile, vinyl chloride, styrene, butadiene, vinylidene chloride, and the like. Suitable polymers for producing such compositions include, for example, those polyethers hereinabove-described. These graft copolymer/polyether compositions can contain from about 1 to about 70 weight percent, preferably about 5 to about 50 weight percent and most preferably about 10 to about 40 weight percent of the unsaturated monomer polymerized in the polyether. Such compositions are conveniently prepared by polymerizing the monomers in the selected polyether at a temperature of 40° to 150° C. in the presence of a free radical polymerization catalyst, such as peroxides, persulfates, percarbonates, perborate and azo compounds as more fully described by the above patent references. The resulting compositions may contain a small amount of unreacted polyether, monomer and free polymer as well as the graft polymer/polyether complex. Especially preferred are the graft polymer/polyethers obtained from mixtures of acrylonitrile and styrene and polyether triols.

The particular organic polyol or polyols employed as the starting materials in this invention merely depend on the end use of the cold cure polyether urethane foam. For instance, the employment of polyether triols having at least 40 mole percent primary hydroxyl groups and molecular weights from 2,000 to 8,000 preferably 4,000 to 7,000 generally have hydroxyl numbers from 84 to 21, preferably 42 to 20 and give primarily flexible polyether foams. The supplementary polyethers which may have any proportion of primary to secondary hydroxyl groups and which may be mixed with the required polyether triols can be used to control the degree of softness of the foam or vary the load bearing properties of the foam. Such limits are not intended to be restrictive, but are merely illustrative of the large number of possible combinations of polyether triols and other polyethers that can be employed.

The hydroxyl number is defined as the number of milligrams of potassium hydroxide required for the complete neutralization of the hydrolysis product of the fully acetylated derivative prepared from one gram of polyol or mixtures of polyols with or without other crosslinking additives used in the invention. The hydroxyl number can also be defined by the equation:

$$OH = \frac{56.1 \times 1000 \times f}{M.W.}$$

wherein OH is the hydroxyl number of the polyol, f is its functionality and m.w. is its molecular weight.

A variety of organic isocyanates can be employed in the foam formulations of this invention for reaction with the organic polyol starting materials above described to provide cold cure polyether urethane foams. Preferred isocyanates are polyisocyanates and polyisothiocyanates of the general formula:

$$Q(NCY)_i$$

wherein Y is oxygen, i is an integer of two or more and Q is an organic radical having the valence of i. For instance, Q can be a substituted or unsubstituted hydrocarbon radical, such as alkylene and arylene, having one or more aryl-NCY bonds and/or one or more alkyl-NCY bonds. Q can also include radicals such as —Q—ZO—, where Q is an alkylene or arylene group and Z is a divalent moiety such as CO, $SO_2$ and the like. Examples of such compounds include hexamethyl diisocyanate, 1,8-diisocyanato-p-methane, xylylene diisocyanates, $(OCNCH_2CH_2CH_2OCH_2)_2O$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4'-4"'-triisocyanate, and isopropylbenzene-alpha-4-diisocyanate. Further included among the isocyanates useful in this invention are dimers and trimers of isocyanates and diisocyanates and polymeric diisocyanates such as those having the general formula:

$$Q(NCY)_i \text{ and } [Q(NCY)_i]_j$$

in which i and j are integers of two or more, and/or (as additional components in the reaction mixtures) compounds of the general formula:

$$L(NCO)_i$$

in which i is one or more and L is a monofunctional or polyfunctional atom or radical. More specifically, the polyisocyanate component employed in the polyurethane foams of this invention also include the following specific compounds as well as mixtures of two or more of them: 2,4-tolylene diisocyanate, 2,6-tolylene diisocyanate, crude tolylene diisocyanate, bis(4-isocyanatophenyl)-methane, polymethylene polyphenylisocyanates that are produced by phosgenation of anilineformaldehyde condensation products, 2,4,6-toluenetriisocyanate, and many other organic polyisocyanates that are known in the art, such as those that are disclosed in an article by Siefken, Ann., 565, 75 (1949). In general, the aromatic polyisocyanates are preferred.

Particularly useful isocyanate components of high resilience cold cure formulations within the scope of this invention are combinations of isomeric tolylene diisocyanates and polymeric isocyanates having units of the formula

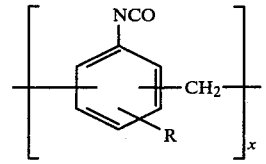

wherein R is hydrogen and/or lower alkyl and x has a value of at least 2.1. Preferably the lower alkyl radical is methyl and x has a value of from 2.1 to about 3.0.

The amount of polyisocyanate employed will vary slightly depending on the nature of the polyurethane being prepared. In general the polyisocyanates are employed in the foam formulations of this invention in amounts that provide from 80 to 150 percent, preferably from 90 to 110 percent of the stoichiometric amount of the isocyanato groups required to react with all of the hydroxyl groups of the organic polyol starting materials and with any water present as a blowing agent. Most preferably, a slight amount of isocyanato groups in excess to the stoichiometric amount is employed.

The blowing agents which can be employed in the process of this invention include water, liquefied gases which have boiling points below 80° F. and above −60° F., or other inert gases such as nitrogen, carbon dioxide, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichlorofluoromethane, dichlorodifluoromethane, dichlorofluoromethane, 1,1-chloro-1-fluoroethane, 1-chloro-1,1-difluoro, 2,2-dichloroethane, and 1,1,1-trifluoro-2-chloro-2-fluoro-3,3-difluoro-4,4,4-trifluorobutane. The preferred blowing agent for the process of this invention is trichlorofluoromethane. The amount of blowing agent used will vary with density desired in the foamed product. Usually from 2 to 20 parts by weight of the blowing agent per 100 parts by weight of the organic polyol starting materials are preferred.

The catalysts employed in this invention to produce polyurethanes include any of the amines or metal catalysts used in producing conventional flexible and high resilience polyurethane foam. Illustrative of such conventional amine catalysts are N-methyl morpholine, N-ethyl morpholine, hexadecyl dimethylamine, triethylamine, N,N,N',N'-tetramethyl-1,3-butanediamine, N,N-dimethylethanolamine, diethanolamine, 3-dimethylamino-N,N-dimethylpropionamide, bis(2-dimethylaminoethyl)-ether, N,N,N',N'-tetramethyl ethylenediamine, 4,4'-methylene bis(2-chloroaniline), dimethyl benzylamine, N-coco morpholine, triethylene diamine, [1,4-dizabicyclo-(2,2,2)-octanel], the formate salts of triethylene diamine, other salts of triethylene diamine and oxyalkylene adducts of primary and secondary amino groups, and the like. Illustrative of such conventional metal catalysts are the tin salts of various carboxylic acids and nickel acetylacetonates. The preferred metal catalysts for the process of this invention is dibutyltindilaurate. Such amine and metal catalysts are preferably employed in the mixtures in an amount from 0.1 to 2 weight percent based on the total weight of the organic polyol starting material.

Other additional ingredients can be employed in minor amounts in producing the high resilience polyurethane foams in accordance with the process of this invention, if desired, for specific purposes. Thus, flame retardants (e.g. trichloroethylphosphite) can be used to reduce any tendency of the polyurethane foam to flammability. Of coarse any suitable organic solvent for the catalysts can be used which does not substantially adversely affect the operation of the process or reactants. Examples of such solvents for the catalysts include polyols (e.g., 2-methyl-2,4-pentanediol), dipropylene glycol and the like.

In accordance with this invention, the high resilience polyurethane foams can be produced by any suitable technique. The preferred process is a one-step or one shot technique wherein all of the reactants are reacted simultaneously with the foaming operation. A second general process is called the prepolymer process whereby a prepolymer is formed by reacting the polyether starting material with a small excess of the isocyanate and later foaming the prepolymer by the reaction with water or an inert blowing agent. Another method which can be used in the quasi-prepolymer technique which involves reacting a large excess of the isocyanate with the polyether product with additional polyether in the presence of a blowing agent. Sometimes it is preferred to premix the polyether starting material and siloxane copolymer mixture although any suitable premixture of the various ingredients can be used. Because of the high exothermic nature of the reaction high resilience polyurethane foams are rapidly produced without the need of any external heat by mixing the reactants at ambient temperatures and pouring the foaming reaction mixture into a suitable mold and allowing the foam to cure itself. Of course, if desired the overall reaction can be even further accelerated by preheating the mold and/or employing conventional high temperature post curing procedures. Within a shorter period of time the cold cure process, with or without post cure, simultaneously achieves a greater degree of cure throughout the entire foam, and shorter tack free and demolding time than is generally achieved with conventional hot cure processes. For instance, high resilience polyurethane foams produced by the cold cure process can be removed from the mold far sooner without substantial damage to the surface than conventional hot cure polyurethane foams. Of course it is to be understood that the cold cure polyurethane foams of this invention can also be prepared in slabstock form, if desired.

The high resilience polyurethane foams produced in accordance with this invention can be used wherever cushioning is desired, e.g., in furniture; in transportation systems, automobiles, planes, etc.; in the packaging of delicate objects; and the like.

The following examples are merely illustrative of the present invention and are not intended as a limitation upon the scope thereof.

Abbreviations

In the exaples, the following abbreviations are used:

| | |
|---|---|
| in. | inch |
| °C. | degree centrigade |
| cc | cubic centimeter |
| Me | methyl |
| Bu | butyl |
| lbs. | pounds |
| min. | minute |
| °F. | degree Fahrenheit |
| rpm | revolutions per minute |
| PHPP | parts per hundred parts polyol on a weight basis |
| cstk | centistroke |
| ft. | feet |
| percent | weight percent |
| VAZO | Azobisisobutyronitrile |
| HMW | High Molecular Weight |
| LMW | Low Molecular Weight |

Starting Materials

In the following examples, the starting materials described below were used:

a. Polyols

Polyol I

A polyether polyol produced by polymerizing propylene oxide and then ethylene oxide using glycerol as a starter. This polyether polyol has an approximate molecular weight of 8000 and a hydroxyl number of approximately 28. It contains about 93.0 percent by weight propylene oxide, 7.0 percent by weight ethylene oxide and about 63 percent primary hydroxyl groups.

Polyol II

A polyether polyol produced by polymerizing propylene oxide and then ethylene oxide using glycerol as a starter. This polyether polyol has an approximate molecular weight of 4500 and a hydroxyl number of approximately 34. It contains about 85.5 percent by weight propylene oxide, 14.5 percent by weight ethylene oxide and about 73 percent primary hydroxyl groups.

Polymer/Polyol I

A polymer/polyol prepared by polymerizing styrene/acrylonitrile in Polyol II using VAZO as a catalyst. This polymer/polyol has a hydroxyl number of approximately 28. The polymer contains a one to one weight ratio of styrene to acrylonitrile and comprises 21 percent by weight of the total weight of the polymer/polyol.

b. Isocyanates

Isocyanate I

This is a mixture of about 80 weight percent 2,4-tolylene diisocyanate and about 20 weight percent 2,6-tolylene diisocyanate.

Isocyanate II

This is a composition consisting of about 80 weight percent Isocyonate I and about 20 weight percent of a polymethylene polyphenylene isocyanate polymer containing about 2.5 to 2.9 moles of NCO per mole of polymer and having an isocyanate content of about 31.4 percent by weight.

c. Polyurethane foam Catalysts

Catalyst I

This is a composition consisting of about 70 percent by weight bis-(N,N-dimethylaminoethyl)ether and about 30 percent by weight dipropylene glycol solvent.

Catalyst II

This is a composition consisting of about 33.3 percent by weight 3-dimethylamino-N,N-dimethyl-propionamide and 66.6 percent by weight ethoxylated phenol solvent.

Catalyst III

This is a composition consisting of about 33 percent by weight triethylenediamine and about 67 percent by weight dipropylene glycol solvent.

Catalyst IV

Dibutyltindilaurate.

Catalyst V

Diethanolamine.

d. Siloxane Copolymer Mixtures

Siloxane Copolymer Mixtures A through F of this this invention and Siloxane Copolymer Mixture II outside the scope of this invention are described in Examples I through XVI below.

e. Blowing Agent I

Trichlorofluoromethane.

In accordance with Examples I through VI, the following surfactant solutions were employed as essential components in the preparation of siloxane copolymer mixtures of this invention. These surfactant solutions have the following composition:

Surfactant Solution GG

This is a composition consisting of about 10 to 40 percent by weight cyanoalkylsiloxane having the formula,

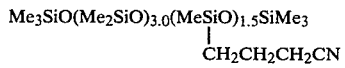

$$Me_3SiO(Me_2SiO)_{3.0}(MeSiO)_{1.5}SiMe_3$$
$$\underset{|}{\phantom{M}}$$
$$CH_2CH_2CH_2CN$$

and about 60 to 90 percent by weight polyoxypropylene triol having a molecular weight of about 3000 and a hydroxyl number of about 56.

Surfactant Solution HH

This is a composition consisting of about 40 to 60 percent by weight siloxane-oxyalkylene copolymer having the formula, $$Me_3SiO(Me_2SiO)_{70}(MeSiO)_{4.5}SiMe_3$$
$$\underset{|}{\phantom{M}}$$
$$C_3H_6(OC_3H_6)_{20}(OC_2H_4)_{20}OMe$$

and about 40 to 60 percent by weight butanol started polyether consisting of about 50 percent by weight polyoxypropylene and about 50 percent by weight polyoxyethylene.

Surfactant Solution JJ

This is a composition consisting of about 10 to 30 percent by weight siloxane-oxyalkylene copolymer having the formula,

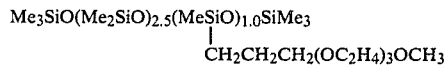

$$Me_3SiO(Me_2SiO)_{2.5}(MeSiO)_{1.0}SiMe_3$$
$$\underset{|}{\phantom{M}}$$
$$CH_2CH_2CH_2(OC_2H_4)_3OCH_3$$

and about 70 to 90 percent by weight polyoxypropylene triol having a molecular weight of about 3000 and a hydroxyl number of about 56.

Surfactant KK

This is a siloxane-oxyalkylene copolymer having the formula,

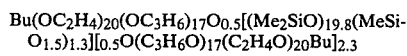

$$Bu(OC_2H_4)_{20}(OC_3H_6)_{17}O_{0.5}[(Me_2SiO)_{19.8}(MeSiO_{1.5})_{1.3}]_{0.5}O(C_3H_6O)_{17}(C_2H_4O)_{20}Bu]_{2.3}$$

EXAMPLE I

Preparation of Novel Siloxane Copolymer Mixture

A siloxane copolymer mixture was prepared by mixing 0.75 parts by weight of Surfactant Solution HH containing a high molecular weight non-hydrolyzable siloxane-oxyalkylene copolymer and 20 parts by weight of Surfactant Solution JJ containing a low molecular weight non-hydrolyzable siloxane-oxyalkylene copolymer. The resulting siloxane copolymer mixture contained a copolymer content of 13.04 percent by weight of the high molecular weight non-hydrolyzable siloxane-oxyalkylene copolymer of Surfactant Solutin HH and 86.96 percent by weight of the low molecular weight non-hydrolyzable siloxane-oxyalkylene copolymer of Surfactant Solution JJ. The mixture is hereinafter referred to as Siloxane Copolymer Mixture A. The composition and properties of the siloxane copolymer mixtures of the Examples are tabulated in Table A below.

EXAMPLE II

Preparation of Novel Siloxane Copolymer Mixture

A siloxane copolymer mixture was prepared by mixing 2.0 parts by weight of Surfactant Solution HH containing a high molecular weight non-hydrolyzable siloxane-oxyalkylene copolymer and 16.0 parts by weight of Surfactant Solution GG containing a low molecular weight non-hydrolyzable cyanoalkylsiloxane. The resulting siloxane copolymer mixture contained a copolymer content of 23.08 percent by weight of the high molecular weight non-hydrolyzable siloxane-oxyalkylene copolymer of Surfactant Solution HH and 76.92 percent by weight of the low molecular weight non-hydrolyzable cyanoalkylsiloxane of Surfactant Solution GG. This mixture is hereinafter referred to as Siloxane Copolymer Mixture B.

EXAMPLE III

Preparation of Novel Siloxane Copolymer Mixture

A siloxane copolymer mixture was prepared by mixing 0.25 parts by weight of Surfactant KK containing a high molecular weight hydrolyzable siloxane-oxyalkylene copolymer and 4.0 parts by weight of Surfactant Solution GG containing a low molecular weight non-hydrolyzable cyanoalkylsiloxane. The resulting siloxane copolymer mixture contained a copolymer content of 5.83 percent by weight of the high molecular weight hydrolyzable siloxane-oxyalkylene copolymer of Surfactant KK and 94.17 percent by weight of the low molecular weight non-hydrolyzable cyanoalkylsiloxane of Surfactant Solution GG. This mixture is hereinafter referred to as Siloxane Copolymer Mixture C.

EXAMPLE IV

Preparation of Novel Siloxane Copolymer Mixture

A siloxane copolymer mixture was prepared by mixing 1.25 parts by weight of Surfactant KK containing a high molecular weight hydrolyzable siloxane-oxyalkylene copolymer and 12.0 parts by weight of Surfactant Solution GG containing a low molecular weight non-hydrolyzable cyanoalkylsiloxane. The resulting siloxane copolymer mixture contained a copolymer content of 20.0 percent by weight of the high molecular weight hydrolyzable siloxane-oxyalkylene copolymer of Surfactant KK and 80.0 percent by weight of the low molecular weight non-hydrolyzable cyanoalkylsiloxane of Surfactant Solution GG. This mixture is hereinafter referred to as Siloxane Copolymer Mixture D.

EXAMPLE V

Preparation of Novel Siloxane Copolymer Mixture

A siloxane copolymer mixture was prepared by mixing 1.50 parts by weight of Surfactant KK containing a high molecular weight hydrolyzable siloxane-oxyalkylene copolymer and 23.0 parts by weight of Surfactant Solution JJ containing a low molecular weight non-hydrolyzable siloxane-oxyalkylene copolymer. The resulting siloxane copolymer mixture contained a copolymer content of 30.0 percent by weight of the high molecular weight hydrolyzable siloxane-oxyalkylene copolymer of Surfactant KK and 70.0 percent by weight of the low molecular weight non-hydrolyzable siloxane-oxyalkylene copolymer of Surfactant Solution JJ. This mixture is hereinafter referred to as Siloxane Copolymer Mixture E.

EXAMPLE VI

Preparation of Novel Siloxane Copolymer Mixture

A siloxane copolymer mixture was prepared by mixing 4.0 parts by weight of Surfactant Solution HH containing a high molecular weight non-hydrolyzable siloxane-oxyalkylene copolymer and 18.0 parts by weight of Surfactant Solution JJ containing a low molecular weight non-hydrolyzable siloxane-oxyalkylene copolymer. The resulting siloxane copolymer mixture contained a copolymer content of 10.0 percent by weight of the high molecular weight non-hydrolyzable siloxane-oxyalkylene copolymer of Surfactant Solution HH and 90.0 percent by weight of the low molecular weight non-hydrolyzable siloxane-oxyalkylene copolymer of Surfactant Solution JJ. This mixture is hereinafter referred to as Siloxane Copolymer Mixture F.

TABLE A

| | SILOXANE COPOLYMER MIXTURES | | | | | |
|---|---|---|---|---|---|---|
| | Molecular Weight | | Weight Percent | | Mixture Weight Ratio | |
| Siloxane Copolymer Mixtures | LMW Siloxane | HMW Siloxane Copolymer | LMW Siloxane Copolymer | HMW Siloxane Copolymer | LMW Siloxane | HMW Siloxane Copolymer |
| A | 522 | 15,116 | 86.96 | 13.04 | 20.0 | 0.75 |
| B | 556 | 15,116 | 76.92 | 23.08 | 16.0 | 2.0 |
| C | 556 | 7,885 | 94.17 | 5.83 | 4.0 | 0.25 |
| D | 556 | 7,885 | 80.0 | 20.0 | 12.0 | 1.25 |
| E | 522 | 7,885 | 70.0 | 30.0 | 23.0 | 1.50 |
| F | 522 | 15,116 | 90.0 | 10.0 | 18.0 | 4.0 |

EXAMPLES VII THROUGH XV

In accordance with these examples, high resilience polyurethane foams were produced using the above described siloxane copolymer mixtures of the present invention as the foam stabilizing surfactant component of the foam-producing reaction mixtures. For the purpose of comparison, two commercially available foam stabilizing surfactants outside the scope of this invention were used individually and are designated herein as Surfactant Solution GG and Surfactant Solution HH.

A siloxane copolymer mixture outside the scope of this invention was also used for the purpose of comparison. The siloxane copolymer mixture was prepared by mixing 0.5 parts by weight of Surfactant Solution HH containing a high molecular weight non-hydrolyzable siloxane-oxyalkylene copolymer and 2.0 parts by weight of Surfactant Solution JJ containing a low molecular weight non-hydrolyzable siloxane-oxyalkylene copolymer. The resulting siloxane copolymer mixture contained a copolymer content of 50 percent by weight of the high molecular weight non-hydrolyzable siloxane-oxyalkylene copolymer of Surfactant Solution HH and 50.0 percent by weight of the low molecular weight non-hydrolyzable siloxane-oxyalkylene copolymer of Surfactant Solution JJ. This mixture is hereinafter referred to as Siloxane Copolymer Mixture II.

The composition of the foam-producing reaction mixtures are given below in Table B.

TABLE B

| | FOAM FORMULATIONS | | |
|---|---|---|---|
| Ingredients | Foam Formulation A (PHPP) | Foam Formulation B (PHPP) | Foam Formulation C (PHPP) |
| Polymer/Polyol I | 100 | 0 | Varied |
| Polyol I | 0 | 100 | 0 |
| Catalyst I | 0.10 | 0.15 | 0.20 |
| Catalyst II | 0.40 | 0.30 | 0.40 |
| Catalyst III | 0.35 | 0.30 | 0.40 |
| Catalyst IV | 0.015 | 0.015 | 0.02 |
| Catalyst V | 0 | 0 | 1.25 |
| $H_2O$ | 3.6 | 3.4 | 3.8 |
| Siloxane Copolymer Mixture | Varied | Varied | Varied |
| Blowing Agent I | 0 | 0 | 3.0 |
| Isocyanate I | Varied | Varied | 0 |
| Isocyanate II | 0 | 0 | Varied |

The foam-producing reactions of Examples VII through XV were carried out in accordance with substantially the same general procedure which entailed the following steps. A siloxane copolymer mixture and a catalyst consisting of dibutyltindilaurate were premixed and dispersed with a spatula. This siloxane copolymer mixture/dibutyltindilaurate catalyst premix was then added by a 5 cc syringe into a Lily cup containing 250 grams of a polyol or polymer/polyol from Table B and dispersed with a spatula until homogeneous, forming a polyol/siloxane copolymer mixture/catalyst blend in the Lily cup. A premix consisting of water, blowing agent and the remaining catalysts of Table B was added to the polyol/siloxane copolymer mixture/catalyst blend and dispersed with a spatula in the Lily cup until homogeneous. The Lily cup containing the foaming components was placed under a drill press equipped with a double three-bladed marine-type propeller about two inches in diameter. The mixing by the drill press was accomplished at 2150 revolutions per minute for ten seconds. Due to the high viscosity of the polyol or polymer/polyol, the Lily cup was moved around to insure proper mixing. Then an isocyanate from Table B was added rapidly to the other components without stopping the drill press and mixing continued for another seven seconds. The reaction mixture was immediately poured into an 8 in.×8 in.×6 in. cake box supported by a wooden mold and allowed to rise. The foam was allowed to rest in the cake box for two minutes after completion of the rise to avoid densification at the bottom of the foam bun. The foam was then cured for about 10 minutes at 125° C. and samples of the foam products were prepared for experimental evaluations.

The siloxane copolymer mixtures of this invention were employed as a solution in the formulation of polyurethane foam. The comparative surfactant solutions and comparative siloxane copolymer mixture outside the scope of this invention were also employed as a solution in the formulation of polyurethane foam. Each solution consisted of a specified weight percent siloxane copolymer mixture and a specified weight percent polyether carrier as d described herein. In the formulation of high resilience polyurethane foam utilizing the siloxane copolymer mixtures of this invention, the relative amount of siloxane copolymer mixture (exclusive of solvents or other additives) varied in amounts ranging from about 0.02 to about 5 parts by weight per hundred parts by weight of the organic polyol starting material.

The results of examples in which the siloxane copolymer mixtures of this invention are utilized as the foam stabilizing surfactant component of the foam-producing reaction mixture are given in Table C below. Also, the results of examples in which Surfactant Solution GG, Surfactant Solution HH and Siloxane Copolymer Mixture II, all outside the scope of this invention, are utilized as the foam-stabilizing surfactant component of the foam-producing reaction mixture are given in Table C below.

TABLE C

EVALUATION OF SILOXANE COPOLYMER MIXTURES IN CRITICAL LOW DENSITY HIGH RESILIENCE FOAM FORMULATIONS

| EXAMPLE | SILOXANE COPOLYMER MIXTURE/ SURFACTANT SOLUTION | CONCENTRATION* (PHPP) | COARSE CELLS | SHRINKAGE | PROCESSING** LATITUDE |
|---|---|---|---|---|---|
| VII | A | 0.75 | Slight | None | |
| | | 1.0 | None | None | 1.75 |
| | | 1.5 | None | None | |
| | | 2.0 | None | None | |
| | | 2.5 | None | Slight | |
| | | 3.5 | None | Moderate | |
| VIII | B | 0.5 | Slight | None | |
| | | 0.75 | None | None | |
| | | 1.5 | None | None | 2.50 |
| | | 3.0 | None | Moderate | |
| | | 3.5 | None | Severe | |
| IX | C | 0.5 | None | None | 2.50 |
| | | 0.75 | None | None | |
| | | 1.5 | None | None | |
| | | 2.5 | None | None | |
| X | D | 0.5 | None | None | |
| | | 1.0 | None | None | 1.50 |
| | | 1.5 | None | None | |
| | | 2.0 | None | Slight | |
| | | 2.5 | None | Moderate | |
| XI | E | 0.25 | Very Slight | None | |
| | | 0.75 | Very Slight | None | |
| | | 1.5 | Very Slight | Slight | 1.25 |
| | | 2.5 | Very Slight | Moderate | |
| | | 3.5 | Very Slight | Moderate/Severe | |
| XII | F | 0.25 | Very Slight | None | |
| | | 0.5 | Very Slight | None | |
| | | 0.75 | Very Slight | None | 2.25 |
| | | 1.0 | Very Slight | None | |
| | | 1.5 | Very Slight | None | |
| | | 2.5 | Very Slight | Slight | |
| | | 3.5 | Very Slight | Moderate/Severe | |
| XIII*** | GG | 0.5 | Collapse | Collapse | |
| | | 2.0 | Collapse | Collapse | 0 |
| | | 4.0 | Collapse | Collapse | |
| XIV*** | HH | 0.25 | None | Severe | |
| | | 0.5 | None | Severe | 0 |
| | | 0.1 | None | Severe | |
| | | 0.05 | None | Moderate/Severe | |
| XV*** | II | 0.2 | None | None | |
| | | 0.6 | None | Slight | |
| | | 1.0 | None | Moderate | 0 |

TABLE C-continued
EVALUATION OF SILOXANE COPOLYMER MIXTURES IN CRITICAL LOW DENSITY HIGH RESILIENCE FOAM FORMULATIONS

| EXAMPLE | SILOXANE COPOLYMER MIXTURE/ SURFACTANT SOLUTION | CONCENTRATION* (PHPP) | COARSE CELLS | SHRINKAGE | PROCESSING** LATITUDE |
|---|---|---|---|---|---|
| | | 1.5 | None | Severe | |

*Concentration of surfactant solution.
**Processing latitude is defined as the difference (concentration range) between the lowest concentration having none or slight coarse cells and shrinkage and the highest concentration having none or slight coarse cells and shrinkage. For example, the foam formulation utilizing Siloxane Copolymer Mixture A (Example VII) exhibits slight coarse cells and no shrinkage at a low concentration of 0.75, and no coarse cells and slight shrinkage at a high concentration of 2.50, hence a processing latitude of 1.75.
***These Examples represent surfactant copolymers which are outside the scope of this invention.

The data of Table C demonstrates that the siloxane copolymer mixtures of this invention are effective stabilizers in high resilience polyurethane foam formulations and superior to the comparative surfactants.

EXAMPLE XVI

Siloxane Copolymer Mixture B was evaluated on an industrial scale machine as a foam stabilizing surfactant component in the formulation of high resilience molded polyurethane foam. The processing conditions of the industrial scale machine are described in Table D below.

TABLE D
HIGH RESILIENCE MOLDED POLYURETHANE FOAM PROCESSING CONDITIONS

| MACHINE CONDITIONS | |
|---|---|
| Type Machine | Admiral |
| Mixing Head | Low Pressure-High Shear |
| Throughput, lbs./min. | 127 |
| Steam Temperature, °F. | 75 |
| Number of Streams | 4 |
| MOLDING CONDITION | |
| Mold Design | 15 feet × 4 feet × 15 inches |
| Mold Construction | Aluminum |
| Size Venting | 1/16 inch Diameter |
| Mold Temperature, °F. | 120–145 |
| Demold Time, Minutes | 12 minutes |
| Release Agent | Brulin's 804-07SH |
| Post-Cure | 30 minutes @ 250° F. |

The results of utilizing Siloxane Copolymer Mixture B as a foam stabilizing surfactant component for the formulation of high resilience molded polyurethane foam employing an industrial scale machine are described in Table E below.

TABLE E
EVALUATION OF SILOXANE COPOLYMER MIXTURE B IN INDUSTRIAL MACHINE

| EXAMPLE | SILOXANE COPOLYMER MIXTURE/SURFACTANT SOLUTION | CONCENTRATION* (PHPP) | COARSE CELLS | SHRINKAGE | PROCESSING** LATITUDE |
|---|---|---|---|---|---|
| XVI | B | .75 | Slight | None | |
| | | 1.0 | None | None | |
| | | 2.0 | None | None | 2.25 |
| | | 2.5 | None | None | |
| | | 3.0 | None | Slight | |
| | | 3.5 | None | Moderate | |

*Concentration of surfactant solution.
**Processing latitude is defined as the difference (concentration range) between the lowest concentration having none or slight coarse cells and shrinkage and highest concentration having none or slight coarse cells and shrinkage. For example, the foam formulation utilizing Siloxane Copolymer Mixture B (Example XVI) exhibits slight coarse cells and no shrinkage at a low concentration of 0.75, and no coarse cells and slight shrinkage at a high concentration of 3.0, hence a processing latitude of 2.25.

The data of Table E demonstrates that Siloxane Copolymer Mixture B of this invention is also an effective stabilizer for high resilience molded polyurethane foam formulated in an industrial scale machine.

What is claimed is:

1. A siloxane copolymer mixture comprising: (1) from about 1 to about 35 weight percent of a high molecular weight siloxane-oxyalkylene copolymer selected from the group consisting of: (a) a siloxane-oxyalkylene copolymer having the average formula:

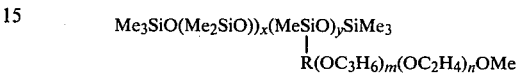

where Me is methyl, R is an alkylene containing 2 to 4 carbon atoms, x has an average value from about 50 to about 70, y has an average value from about 4 to about 15, m has an average value from about 15 to about 25, and n has an average value from about 15 to about 25; and (b) a siloxane-oxyalkylene copolymer having the average formula:

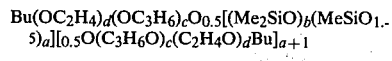

where Me is methyl, Bu is butyl, a has an average value from 1 to 2, b has an average value from about 12 to about 24, c has an average value from about 10 to about 30, and d has an average value from about 10 to about 40; and (2) from about 65 to about 99 weight percent of a low molecular weight siloxane selected from the group consisting of: (c) a siloxane-oxyalkylene copolymer having the average formula:

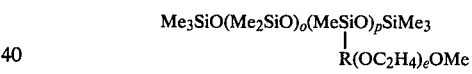

where Me is methyl, R is an alkylene containing 2 to 4 carbon atoms, o has an average value from about 1 to about 4, p has an average value from about 0.5 to about 3, and e has an average value from about 1 to about 5; and (d) a cyanoalkylsiloxane having the average formula:

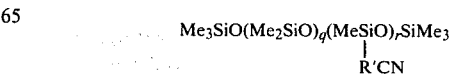

where Me is methyl, R' is an alkylene containing 3 to 6 carbon atoms, q has an average value from about 1 to about 4, and r has an average value from about 0.5 to about 4, said weight percents being based on the weights of (1) and (2).

2. A siloxane copolymer mixture comprising: (1) from about 5 to about 20 weight percent of a high molecular weight siloxane-oxyalkylene copolymer having the average composition,

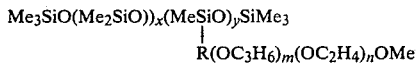

wherein Me is methyl, R is an alkylene containing from 2 to 4 carbon atoms, x has an average value from about 50 to about 70, y has an average value from about 4 to about 15, m has an average value from about 15 to about 25, and n has an average value from about 15 to about 25; and (2) from about 80 to about 95 weight percent of a low molecular weight siloxane-oxyalkylene copolymer having the average composition,

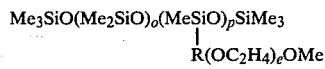

where Me is methyl, R is an alkylene containing from 2 to 4 carbon atoms, o has an average value from about 1 to about 4, p has an average value from about 0.5 to about 3, and e has an average value from about 1 to about 5, said weight percents being based on the weights of (1) and (2).

3. A siloxane copolymer mixture comprising: (1) from about 20 to about 30 weight percent of a high molecular weight siloxane-oxyalkylene copolymer having the average composition,

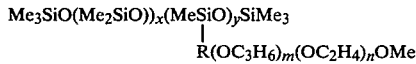

where Me is methyl, R is an alkylene containing from 2 to 4 carbon atoms, x has an average value from about 50 to about 70, y has an average value from about 4 to about 15, m has an average value from about 15 to about 25, and n has an average value from about 15 to about 25; and (2) from about 70 to about 80 weight percent of a low molecular weight cyanoalkylsiloxane having the average composition,

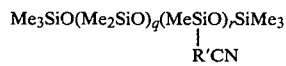

where Me is methyl, R' is an alkylene containing from 3 to 6 carbon atoms, q has an average value from about 1 to about 4, and r has an average value from about 0.5 to about 4, said weight percents being based on the weights of (1) and (2).

4. A siloxane copolymer mixture comprising: (1) from about 25 to about 35 weight percent of a high molecular weight siloxane-oxyalkylene copolymer having the average composition:

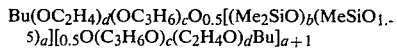

where Me is methyl, Bu is butyl, a has an average value from 1 to 2, b has an average value from about 12 to about 24, c has an average value from about 10 to about 30, and d has an average value from about 10 to about 40; and (2) from about 65 to about 75 weight percent of a low molecular weight siloxane-oxyalkylene copolymer having the average composition,

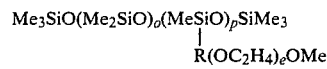

where Me is methyl, R is an alkylene containing 2 to 4 carbon atoms, o has an average value from about 1 to about 4, p has an average value from about 0.5 to about 3, and e has an average value from about 1 to about 5, said weight percents being based on the weights of (1) and (2).

5. A siloxane copolymer mixture comprising: (1) from about 1 to about 25 weight percent of a high molecular weight siloxane-oxyalkylene copolymer having the average composition,

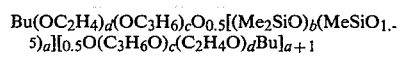

where Me is methyl, Bu is butyl, a has an average value from 1 to 2, b has an average value from about 12 to about 24, c has an average value from about 10 to about 30, and d has an average value from about 10 to about 40; and (2) from about 75 to about 99 weight percent of a low molecular weight cyanoalkylsiloxane having the average composition,

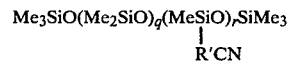

where Me is methyl, R' is an alkylene containing 3 to 6 carbon atoms, q has an average value from about 1 to about 4, and r has an average value from about 0.5 to about 4, said weight percents being based on the weights of (1) and (2).

6. A siloxane copolymer mixture as claimed in claim 1 wherein the high molecular weight siloxane-oxyalkylene copolymers have a molecular weight of from 4,000 to 30,000 and the low molecular weight siloxane-oxyalkylene copolymer and cyanoalkylsiloxane have a molecular weight of from 300 to 1100.

7. A composition consisting essentially of a minor amount of a siloxane copolymer mixture as claimed in claim 1 and a major amount of a solvent therefor.

8. A composition as claimed in claim 7 wherein the solvent is selected from the group consisting of polyether triols, polyether diols and polyether mono-ols, preferably the adducts of ethylene oxide, propylene oxide or butylene oxide with glycerol, water, trimethylolpropane, 1,2,6-hexanetriol, ethylene glycol, butanol, or nonylphenol starters.

9. A composition as claimed in claim 7 wherein the siloxane copolymer mixture is present in the amount of from one to 20 weight percent and the solvent is present in the amount of from 80 to 99 weight percent.

10. A process for producing high resilience polyurethane foam having a density of no greater than 2.0 pounds per cubic foot, said process comprising foaming and reacting a reaction mixture comprising: (a) an organic polyol selected from the group consisting of (i) a polyether triol containing at least 40 mole percent primary hydroxyl groups and having a molecular weight from about 2000 to about 8000 and (ii) a mixture of said polyether triol and other polyethers having an average of at least two hydroxyl groups, said polyether triol of said mixture amounting to at least 40 weight percent of the total polyol content; (b) a polyisocyanate, said organic polyol and said polyisocyanate being present in the mixture in a major amount and in the relative amount required to produce the polyurethane foam; (c) a blowing agent in a minor amount sufficient to foam the reaction mixture; (d) a catalytic amount of catalysts for the production of polyurethane foam; (e) a minor amount of the siloxane copolymer mixture as defined in claim 1; and, optionally, (f) a flame retardant in a minor amount sufficient to retard the flammability of the polyurethane foam.

11. The high resilience polyurethane foam produced by the process as defined in claim 10.

* * * * *